Patented Aug. 3, 1954

2,685,572

UNITED STATES PATENT OFFICE 2,685,572

CEMENTS FOR ATTACHING SHOE SOLES

John L. Perkins, Hingham, and Edwin E. Sylvester, Watertown, Mass., assignors to B. B. Chemical Co., Boston, Mass., a corporation of Massachusetts No Drawing. Application June 29, 1951, Serial No. 234,453

7 Claims. (Cl. 260—33.8)

This invention relates to adhesive compositions adapted to be activated by heat for securing together leather and shoe parts.

Cements comprising a butadiene-acrylonitrile copolymer and a toughening material are known and have gone into extensive use for securing together leather and shoe parts. A cement of this type, disclosed in the patent to Teppema et al., No. 2,367,629, of January 16, 1945, comprises a solution of a butadiene-acrylonitrile copolymer and a copolymer of vinyl chloride and vinyl acetate. A coating of the cement is applied as a solution to the sole and upper; and the coating is dried until tack free. The cement is then activated by treatment with a solvent; and the sole and upper are pressed together for a sufficient dwell, e. g., 60 seconds, to form a firm bond between the sole and upper.

It is a feature of the present invention to avoid the expense and inconveniences of solvent activation by providing a new butadiene-acrylonitrile copolymer base cement which may be activated by heat. Soles may be bonded to shoe uppers by coating surfaces with the new cement, heating the coated surfaces and pressing them together while the cement is at an elevated temperature.

The new cement comprises a butadiene-acrylonitrile copolymer rubber and a vinyl chloride-vinyl acetate copolymer in which the vinyl chloride constituent predominates, together with basic zinc carbonate $ZnCO_3 \cdot 2Zn(OH)_2 \cdot H_2O$ and a resinous chlorinated aromatic hydrocarbon.

It has been found that the basic zinc carbonate and the chlorinated hydrocarbon coact with the butadiene-acrylonitrile copolymer and vinyl chloride-vinyl acetate copolymer to give a composition which when heated develops the ability to cohere to a similar film. Notwithstanding their action in giving the ability to cohere to heated cement films, it is the peculiar action of the zinc carbonate and chlorinated hydrocarbon to improve, rather than to harm, the cold flow characteristics of the resulting bond. The extraordinary nature of this action is evident from the fact that while the bond may be formed when cement surfaces are heated to a temperature which may be as low as 140° F. and pressed together, the bond gives a remarkably low cold flow value under the usual cold flow test at 120° F.

To obtain this remarkable action, the zinc carbonate is preferably employed in the proportion of about 10 parts to about 30 parts by weight, preferably 25 parts by weight, with 100 parts by weight of the butadiene-acrylonitrile copolymer. The chlorinated hydrocarbon may be used in the proportion of from about 10 parts to about 50 parts by weight, preferably from 30 parts to 40 parts by weight, with 100 parts by weight of the butadiene-acrylonitrile copolymer.

Preferred chlorinated aromatic hydrocarbons are resinous condensates of chlorinated aromatic compounds, the condensates being composed of isomeric Bis (chlorinated naphthyl) methane in which the naphthyl group contains one to two chlorine atoms, and the "Aroclors." Materials found particularly useful are a resinous material composed of isomeric Bis (chlornaphthyl) methane and polymers having a chlorine content of about 25%, a specific gravity at 25° C. of 1.29 to 1.32, a softening point of 65° to 70° C., a Stormer viscosity at 130° C. of 20 to 27 and a Saybolt Furol viscosity of 20 to 30 at 130° C.; a resinous material composed of isomeric Bis(dichlornaphthyl) methane and polymers having a chlorine content of from about 32% to about 35%, a specific gravity of 1.40 to 1.45 at 25° C., a softening point of 79° to 83° C., a Stormer viscosity of 59 to 89 at 130° C. and a Saybolt Furol viscosity of 78 to 180 at 130° C.; and "Aroclor 4465," a yellow, transparent brittle chlorinated biphenyl resin having a chlorine content of about 65% to about 67%, a softening point of about 60° to 66° C. and a specific gravity of 1.712 to 1.723.

The vinyl chloride-vinyl acetate copolymer is employed in the proportion of approximately 100 parts by weight to 100 parts by weight of the butadiene-acrylonitrile copolymer. However, as little as 75 parts and as much as 125 parts by weight may be employed in combination with 100 parts by weight of the butadiene-acrylonitrile copolymer. Suitable vinyl chloride-vinyl acetate copolymer resins may contain from 9½% to 15% of vinyl acetate and from 85% to 90.5% of vinyl chloride. For best results, it has been found desirable to employ a mixture of these vinyl copolymer resins. A preferred mixture includes one part of a vinyl chloride-vinyl acetate copolymer resin known as "Vinylite VYNS," made by the Carbide and Carbon Chemical Corp., 30 E. 42nd Street, New York 17, New York, which is understood to have a vinyl chloride content of 88.5% to 90.5%, an intrinsic viscosity in cyclohexanone at 20° C. of 0.79, and a specific gravity of 1.36, with from 2 to 4 parts of a vinyl copolymer resin known as "Vinylite VYHH," also manufactured by the Carbide and Carbon Chemical Corp., which is understood to have a vinyl chloride content of 85% to 88%, an intrinsic viscosity of 0.53 and a specific gravity of 1.36. With this mixture of copolymer resins, there may also be included up to 1 part of a copolymer resin known as "Vinylite VYCC," also obtained from the Carbide and Carbon Chemical Corp., which is understood to have a vinyl chloride content of about 62% and vinyl acetate content of about 38%, an intrinsic viscosity of 0.28 and a specific gravity of 1.30.

Suitable butadiene-acrylonitrile copolymer rubbers may contain from about 25% to about 45% of acrylonitrile. Copolymer rubbers which have been found particularly satisfactory are "Hycar OR–15" and "Hycar OR–25," which are obtained from the B. F. Goodrich Company of Akron, Ohio, and which are understood to have acrylonitrile contents of about 45% and about 33% respectively.

It has been found desirable to incorporate a plasticizer such as dioctyl phthalate in the composition for its usual purposes.

Any suitable solvent or solvent mixture capable of dissolving the composition may be employed. It has been found desirable, however, to employ methyl ethyl ketone since it is sufficiently volatile for rapid drying of the cement and forms solutions which are stable over extended periods of time. Sufficient solvent is employed to give an adhesive having a solids content of from 20% to 40% and preferably in the range of from 28% to 32%.

In the bonding of leather or shoe parts by the cement of this invention, the shoe parts, for example, an outsole and shoe upper, are mechanically prepared for sole attaching, preferably by roughing the surface to be attached, for example, by an emery wheel or a wire brush, in order to provide the most satisfactory surfaces for cementing. The cement comprising a solution of the butadiene-acrylonitrile copolymer, the vinyl resins, and the chlorinated hydrocarbon containing the zinc carbonate in dispersion is then applied preferably to both surfaces to be united. The application of the cement may be by brush, by extrusion or in any other suitable manner. The cement is permitted to dry to form films on the respective attaching surfaces which are anchored securely to the outsole and upper respectively. At any time thereafter, preferably up to about three days after the upper has been coated with adhesive and up to about seven days after the sole has been coated with cement, the outsole and shoe upper may be subjected to heat and pressed together with the attaching surfaces in juxtaposition.

According to a preferred procedure, the coating on the upper may be activated by treatment with an infrared lamp or other heating device; and the coated sole may be heated in a moist heat apparatus. The moist heat apparatus involves a chamber provided with a heater, and a device for bubbling air through a body of water maintained at from 85° to 95° C. The air may be superheated in the chamber to a temperature of from 120° to 180° C. and is circulated around an adhesive coated sole disposed in the chamber. With such treatment it is found that the cement on the leather sole is raised to a temperature suitable for attaching to the upper, e. g., a temperature of from 140° to 150° F., in from 48 seconds to one minute. The outsole and shoe upper on which the cement films are heat activated are then pressed together under a sole attaching pressure, suitably about 80 pounds per square inch, for from 15 to 60 seconds.

It has also been found that it may be unnecessary to activate the cement on the shoe upper, where the cement on the outsole is at a temperature such that it will activate and bond with the unheated adhesive on the upper.

Exceptionally strong bonds have been obtained by the use of the cement and sole adhering method herein disclosed. Bonds are usually obtained giving a peel-pull test of 45 pounds to 50 pounds per square inch, and frequently bonds sufficiently strong to cause failure of the leather are obtained.

The following example of a heat activatable cement is given to aid in understanding the invention and is not to be taken as limiting the invention to the specific ingredients and proportions set forth in the example.

*Example I*

| | Parts by weight |
|---|---|
| Butadiene-acrylonitrile copolymer (Hycar type OR–25) | 100 |
| Zinc carbonate | 15 |
| Resinous copolymer of vinyl chloride-vinyl acetate (VYNS resin) | 25 |
| Resinous copolymer of vinyl chloride-vinyl acetate (VYHH resin) | 63 |
| Resinous copolymer of vinyl chloride-vinyl acetate (VYCC resin) | 12½ |
| Dioctyl phthalate | 20 |
| Resinous condensate of chlorinated aromatic hydrocarbon composed of isomeric Bis (chloronaphthyl) methane and polymers | 35 |
| Methyl ethyl ketone | 590 |

The above composition may be prepared by milling together the butadiene-acrylonitrile copolymer, together with the zinc carbonate. The milled mixture was sheeted out, cut up and dissolved in the methyl ethyl ketone in a churn along with the chlorinated aromatic material, the vinyl resins and the dioctyl phthalate.

An outsole and a shoe upper were mechanically prepared for sole attaching by roughing with a wire brush, the surfaces to be attached. A coating of the cement was then applied to the surfaces to be united of both the outsole and the upper, and was permitted to dry. After two days, the coating on the upper was activated by treatment with an infrared lamp to raise its temperature to about 140° C. and the coated sole was placed in a moist heat apparatus maintained at a temperature of about 150° C. through which was circulated air containing moisture which it had picked up in bubbling in a body of water maintained at from 85° to 95° C. After one minute in the chamber, the temperature of the coating had reached approximately 140° F. The outsole and shoe upper on which the coatings had been activated were then pressed together with a pressure of about 80 pounds per square inch for about 60 seconds. A very satisfactory bond between the outsole and the upper was obtained.

*Example II*

| | Parts by weight |
|---|---|
| Butadiene-acrylonitrile copolymer (Hycar OR–15) | 100 |
| Zinc carbonate | 25 |
| Chlorinated biphenyl (Aroclor 4465) | 50 |
| Copolymer of vinyl chloride-vinyl acetate (Vinylite VYHH) | 75 |
| Copolymer of vinyl chloride-vinyl acetate (VYNS resin) | 25 |
| Dioctyl phthalate | 20 |
| Methyl ethyl ketone | 700 |

The above composition was prepared by milling together the butadiene-acrylonitrile copolymer with the zinc carbonate. The milled mixture was sheeted out, cut up and dissolved in a solvent in a churn along with the chlorinated biphenyl, the vinyl resins and the dioctyl phthalate.

The resulting cement was employed for bonding shoe parts, for example an outsole to a shoe upper by substantially the same procedure as described in connection with Example I.

This application is a continuation in part of our copending application, Serial No. 18,706, filed April 2, 1948, now Patent No. 2,599,581, issued June 10, 1952.

Having thus described our invention, what we claim as new and desire to secure by Letters Patent of the United States is:

1. A heat activatable cement comprising 100 parts by weight of a butadiene-acrylonitrile copolymer rubber containing from 25% to 45% acrylonitrile, from 10 to 30 parts by weight of basic zinc carbonate, from 70 to 125 parts by weight of a copolymer of vinyl chloride and vinyl acetate containing from 85% to 90.5% of vinyl chloride and from 10 to 50 parts by weight of a member of the group consisting of resinous condensates of chlorinated aromatic hydrocarbons, said condensates being composed of isomeric Bis (chlorinated naphthyl) methane and polymers in which the naphthyl group contains one to two chlorine atoms, and having a chlorine content of from 25% to 35% and having a specific gravity of from 1.29 to 1.45 at 25° C., a softening point of from 65° to 83° C., a Stormer viscosity at 130° C. of from 20 to 89 and a Saybolt Furol viscosity at 130° C. of from 20 to 180, and chlorinated biphenyl resins having a chlorine content of 65% to 67%, a softening point of 60° to 66° C. and a specific gravity of 1.712 to 1.723.

2. A heat activatable cement comprising 100 parts by weight of a butadiene-acrylonitrile copolymer rubber containing from 25% to 45% of acrylonitrile, from 10 to 30 parts by weight of basic zinc carbonate, from 10 to 50 parts by weight of resinous condensates of chlorinated aromatic hydrocarbon, said condensates being composed of isomeric Bis (chlorinated naphthyl) methane and polymers in which the naphthyl group contains one to two chlorine atoms, and having a chlorine content of from 25% to 35%, a specific gravity of from 1.29 to 1.45 at 25° C., a softening point of from 65° to 83° C., a Stormer viscosity at 130° C. of from 20 to 89, and a Saybolt Furol viscosity at 130° C. of from 20 to 180, and from 75 to 125 parts by weight of a copolymer of vinyl chloride and vinyl acetate containing from 85% to 90.5% of vinyl chloride.

3. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts by weight of basic zinc carbonate, from 10 to 50 parts by weight of resinous condensates of chlorinated aromatic hydrocarbons, said condensates being composed of isomeric Bis (chlorinated naphthyl) methane and polymers in which the naphthyl group contains one to two chlorine atoms, and having a chlorine content of from 25% to 35%, a specific gravity of from 1.29 to 1.45 at 25° C., a softening point of from 65° to 83° C., a Stormer viscosity of 130° C. of from 20 to 89 and a Saybolt Furol viscosity at 130° C. of from 20 to 180, and from 75 to 125 parts by weight of a copolymer of vinyl chloride and vinyl acetate containing from 85% to 90.5% of vinyl chloride.

4. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts of basic zinc carbonate, from 10 to 50 parts by weight of resinous condensates of chlorinated aromatic hydrocarbons, said condensates being composed of isomeric Bis (chlorinated naphthyl) methane and polymers in which the naphthyl group contains one to two chlorine atoms, and having a chlorine content of from 25% to 35% and having a specific gravity of from 1.29 to 1.45 at 25° C., a softening point of from 65° to 83° C., a Stormer viscosity at 130° C. of from 20 to 89, and a Saybolt Furol viscosity at 130° C. of from 20 to 180, and from 75 to 125 parts by weight of a mixture of 1 part by weight of a copolymer of vinyl chloride and vinyl acetate containing from 85% to 90.5% of vinyl chloride with from 2 to 4 parts by weight of a copolymer of vinyl chloride and vinyl acetate containing from 85% to 88% of vinyl chloride and up to 1 part of a copolymer of vinyl chloride and vinyl acetate containing about 62% vinyl chloride.

5. A heat activatable cement comprising 100 parts by weight of a butadiene-acrylonitrile copolymer rubber containing from 25% to 45% of acrylonitrile, from 10 to 30 parts by weight of basic zinc carbonate, from 10 to 50 parts by weight of a resinous chlorinated biphenyl having a chlorine content of from 65% to 67%, a softening point of 60° to 66° C. and a specific gravity of 1.712 to 1.723, and from 70 to 125 parts by weight of a copolymer of vinyl chloride and vinyl acetate containing from 85% to 90.5% of vinyl chloride.

6. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts by weight of basic zinc carbonate, from 10 to 50 parts by weight of a resinous chlorinated biphenyl having a chlorine content of from 65% to 67%, a softening point of 60° to 66° C. and a specific gravity of 1.712 to 1.723, and from 70 to 125 parts by weight of a copolymer of vinyl chloride and vinyl acetate containing from 85% to 90.5% of vinyl chloride.

7. A cement adapted to deposit a film activatable by heat and adapted for securing soles to shoe uppers comprising a solution in a volatile organic solvent of 100 parts by weight of a butadiene-acrylonitrile copolymer rubber containing from 25% to 45% of acrylonitrile, from 10 to 30 parts of basic zinc carbonate, from 10 to 50 parts by weight of chlorinated biphenyl resin having a chlorine content of 65% to 67%, a softening point of 60° to 66° C. and a specific gravity of 1.712 to 1.723, and from 75 to 125 parts by weight of a mixture of one part of a copolymer of vinyl chloride and vinyl acetate containing from 85% to 90.5% of vinyl chloride with from 2 to 4 parts by weight of a copolymer of vinyl chloride and vinyl acetate containing from 85% to 88% of vinyl chloride, and up to one part of a copolymer of vinyl chloride and vinyl acetate containing about 62% vinyl chloride.

No references cited.